United States Patent
Kumar et al.

(10) Patent No.: US 9,347,825 B2
(45) Date of Patent: May 24, 2016

(54) VEHICLE LAMPS WITH UNIFORM APPARENT BRIGHTNESS

(71) Applicant: Ford Global Technologies, LLC, Dearborn, MI (US)

(72) Inventors: Arun Kumar, Farmington Hills, MI (US); Matthew Cross, Lake Orion, MI (US); Steven Darrell Miller, Livonia, MI (US); Mahendra Somasara Dassanayake, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 14/210,885

(22) Filed: Mar. 14, 2014

(65) Prior Publication Data
US 2014/0268807 A1   Sep. 18, 2014

Related U.S. Application Data

(60) Provisional application No. 61/790,723, filed on Mar. 15, 2013.

(51) Int. Cl.
*F21V 7/06* (2006.01)
*G01J 1/04* (2006.01)
(Continued)

(52) U.S. Cl.
CPC .............. *G01J 1/0411* (2013.01); *B60Q 1/0052* (2013.01); *B60Q 1/0058* (2013.01); *F21S 48/215* (2013.01); *F21S 48/234* (2013.01)

(58) Field of Classification Search
CPC ... G01J 1/0411; B60Q 1/0052; B60Q 1/0058; F21S 48/215; F21S 48/234; F21V 7/0091
See application file for complete search history.

(56) References Cited

U.S. PATENT DOCUMENTS 5,471,371 A * 11/1995 Koppolu ............... F21S 48/119
362/307
6,722,777 B2    4/2004 Erber
(Continued)

*Primary Examiner* — Peggy Neils
(74) *Attorney, Agent, or Firm* — Jason C. Rogers; Brooks Kushman P.C.

(57) ABSTRACT

A Parabolic-Type reflector has a uniform Apparent Brightness over the reflector surface. A model of the reflector is divided into a plurality of elements arrayed radially around the reflector focus. Each element has a length $l_i$ measured radially from the focus and perpendicular to an optical axis of the reflector, and an initial depth d-init$_i$ measured parallel to the optical axis. For each element, a light-angle $\alpha_i$ is calculated, the angle of light from the light source subtended by the element. An Apparent Brightness is found for each element, $AB_i \equiv \alpha_i/l_i$. The element $e_{min}$ with the lowest Apparent Brightness $AB_{min}$ is identified. For each element other than $e_{min}$ a required light-angle is found, the required light-angle $\alpha\text{-corr}_i = AB_{min} \times l_i$. While maintaining $l_i$, the initial depth d-init$_i$ of the element is reduced to a corrected depth d-corr$_i$ necessary to achieve $\alpha\text{-corr}_i$.

10 Claims, 5 Drawing Sheets

(51) Int. Cl.
*B60Q 1/00* (2006.01)
*F21S 8/10* (2006.01)

(56) References Cited

U.S. PATENT DOCUMENTS

| | | |
|---|---|---|
| 6,811,287 B2 | 11/2004 | Roller et al. |
| 6,951,415 B2 | 10/2005 | Amano et al. |
| 7,588,358 B1 | 9/2009 | Condon |
| 7,604,384 B2 | 10/2009 | Peck |
| 7,772,988 B1 | 8/2010 | Condon et al. |
| 2004/0057244 A1 | 3/2004 | Amano |
| 2006/0109654 A1 | 5/2006 | Coushaine et al. |
| 2008/0316761 A1* | 12/2008 | Minano ............... G02B 3/0068 362/518 |
| 2010/0315827 A1 | 12/2010 | Benter et al. |
| 2012/0300449 A1* | 11/2012 | Fields ................. F21V 7/0058 362/231 |

\* cited by examiner

VEHICLE LAMPS WITH UNIFORM APPARENT BRIGHTNESS

CROSS-REFERENCE TO RELATED APPLICATIONS

This application claims the benefit of U.S. provisional application Ser. No. 61/790,723 filed Mar. 15, 2013, the disclosure of which is hereby incorporated in its entirety by reference herein.

TECHNICAL FIELD

The present invention relates to functional and ornamental lamps of the type used in automotive vehicles. Specifically, the invention relates to a method for designing such lamps to have a uniform Apparent Brightness over all or most of the surface area of the lamp.

BACKGROUND

Automotive vehicle lamps include functional lamps (tail lamps, brake lamps, turn indicators, fog lamps, and daytime running lamps, for example) and ornamental or "signature" lamps. In the design of vehicle lamps, aesthetic appearance, brightness, and energy efficiency are all of importance. Lamps should, in general, be able to generate a high brightness/intensity when desired, and do so with an economical use of electrical power.

Modern vehicle designs have moved away from more traditional circular, oval, or rectangular lamps and toward relatively complicated shapes. One enabler of this trend has been the availability of light emitting diodes (LEDs), which may be arranged in multiples to create a wide variety of complex shapes, outlines, and appearances.

The use of multiple LEDs to produce a desired outline may appear as a pattern of discrete dots of light, even if a diffusing lens is placed over the LEDs. Also, the use of numerous LEDs may add cost to the design.

SUMMARY

A first embodiment discloses a method for designing a Parabolic-Type reflector having a uniform Apparent Brightness over all (or a desired portion) of the reflector surface. A computational model of the reflector is created, and the desired portion of the model is divided into a plurality n of elements e arrayed around the focus of the reflector. A light source is located at the focus. An Apparent Brightness AB is determined for each element, AB quantifying an amount of light from the source that is reflected along an optical axis of the reflector. The element $e_{min}$ having a minimum value of Apparent Brightness $AB_{min}$ is identified, this element establishing the limiting value of AB for the entire reflector. Each element other than $e_{min}$ has its Apparent Brightness corrected downward to be equal to $AB_{min}$. This correction is achieved by altering the dimensions and/or orientation of the element as necessary.

Another embodiment the analysis method comprises dividing a mathematical model of the reflector into a plurality n of elements e arrayed radially around the focus. Each element $e_i$ has a length $l_i$ measured radially from the focus and perpendicular to an optical axis of the reflector, and has an initial depth d-init$_i$ measured parallel to the optical axis. A light-angle $\alpha_i$ is calculated for each element $e_i$, the light-angle $\alpha_i$ being the angle (measured in a plane passing through the optical axis) of light emitted by the light source and which is subtended by the element $e_i$. An Apparent Brightness AB is found for each element, $AB_i \equiv \alpha_i/l_i$. A lowest-brightness element $e_{min}$ having the lowest value of Apparent Brightness $AB_{min}$ is identified. For each element other than $e_{min}$ a required light-angle is found, the required light-angle $\alpha\text{-corr}_i = AB_{min} \times l_i$. While maintaining $l_i$, the initial depth d-init$_i$ of the element is reduced to reach a corrected depth d-corr$_i$ necessary to achieve $\alpha\text{-corr}_i$.

In another embodiment, a lamp is designed to have a uniform apparent brightness. The lamp comprises a light source located at a focus of the lamp and emitting light around an arc centered on an optical axis passing through the focus, and a Parabolic-Type reflector having a plurality n of elements e arrayed radially with respect to the optical axis. Each element $e_i$ is located a radial distance $r_i$ from the focus, has a length $l_i$ measured radially from and perpendicular to the optical axis, has a depth $d_i$ measured parallel with the optical axis, and subtends a light-angle $\alpha_i$ (measured in a plane containing the optical axis) within the light emitted from the source. The length $l_i$ and radial distance $r_i$ of adjacent elements varies around the arc. The depth $d_i$ of each element varies in a manner to achieve a light-angle $\alpha_i$ such that $\alpha_i/l_i$ is a constant for all elements for which a uniform apparent brightness is desired.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
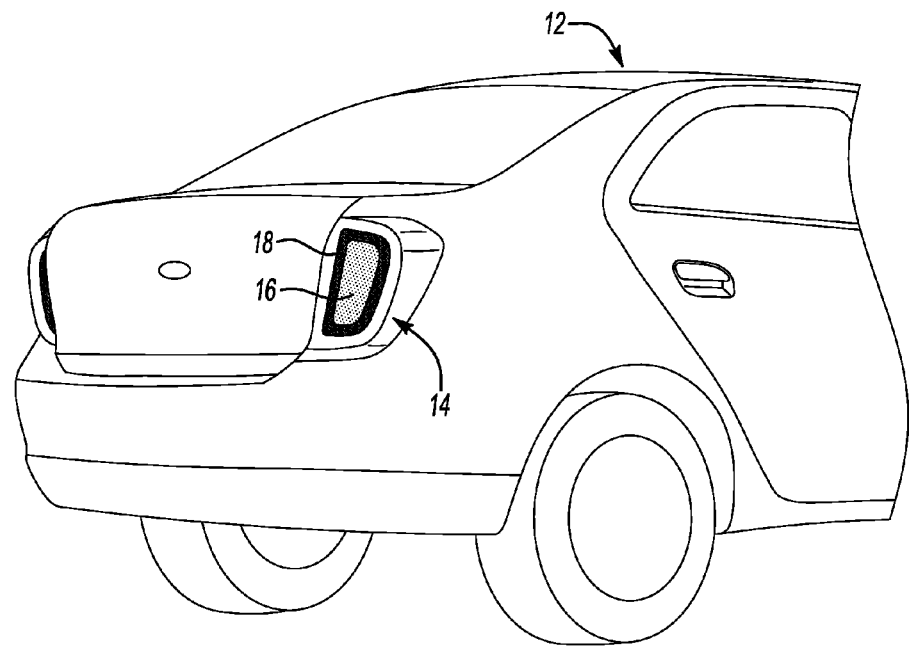
FIG. 1 is a generalized view of the rear corner of an automotive vehicle showing a tail lamp assembly.

As seen in FIG. 1, an automotive vehicle 12 has a tail lamp assembly 14 mounted on and/or integrated with a right, rear portion of the body. Tail lamp assembly 14 includes an inner lamp 16, and an outer lamp 18 surrounding the inner lamp. The inner lamp 16 may, for example, serve as a turn indicator lamp and the outer lamp 18 may serve as a brake lamp. The generally D-shaped appearance of outer lamp 18 is by way of example only, as the invention may be practiced in relation to a lamp having any shape.

Figure 2:
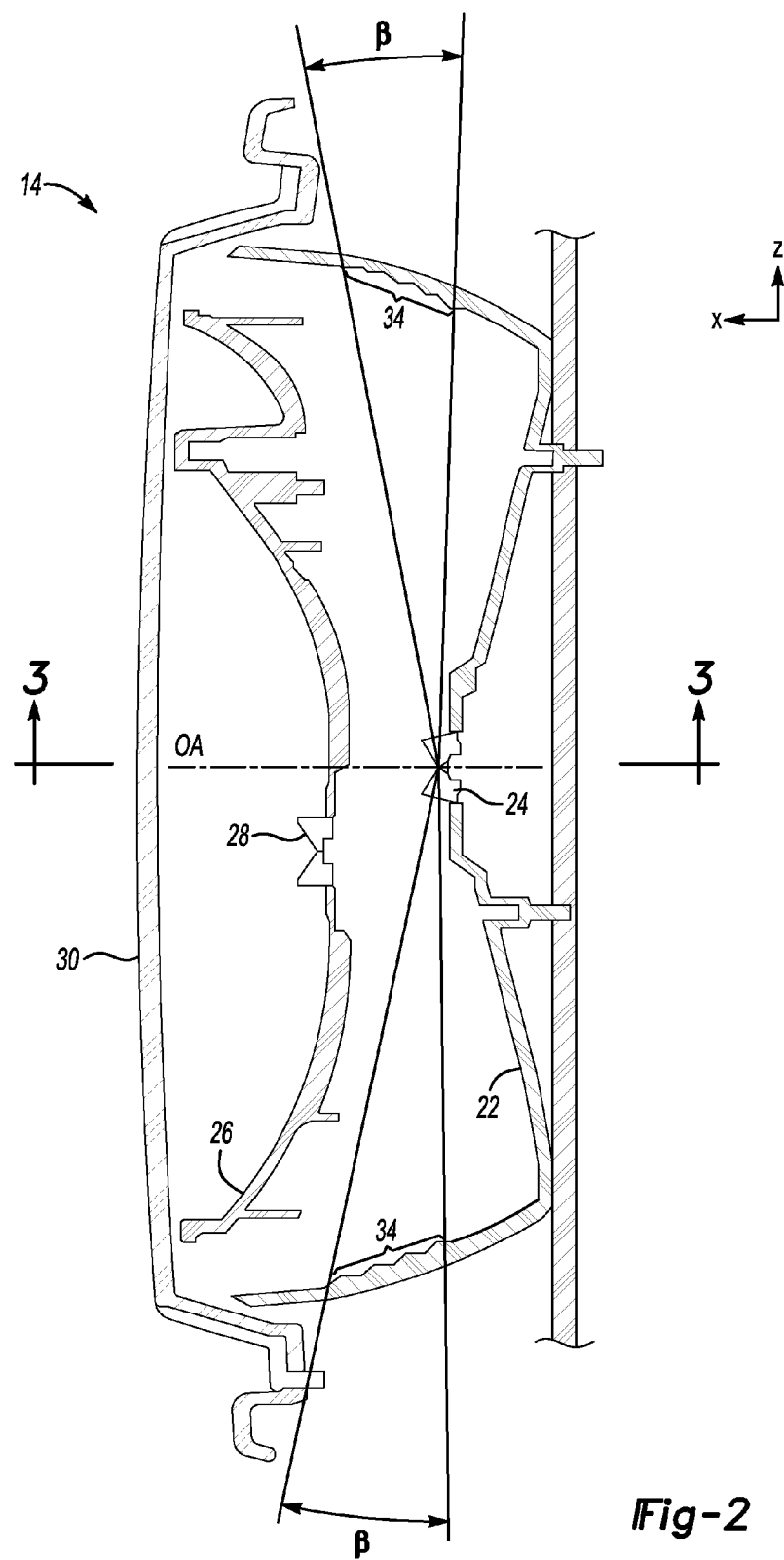
FIG. 2 is a schematic cross-sectional view taken along the line 2-2 indicated in FIG. 1.

FIG. 2 is a simplified, schematic cross-section along a vertical axis (the vehicle z-axis) through the tail lamp assembly 14 of FIG. 1. FIG. 2 shows only the portions/components of the assembly pertinent to the present disclosure. The assembly 14 includes an outer reflector shell 22, an outer LED 24, an inner reflector shell 26, an inner LED 28, and a lens 30. The tail lamp assembly 14 is secured to a housing 20 which establishes at least a forward (relative to the overall vehicle) boundary of the package space available for the lamp assembly.

Reflector shells 22, 26 may be injection-molded plastic components and (as discussed in greater detail below) have pertinent portions of their respective inner surfaces shaped and coated with highly reflective material so as function as parabolic-type reflectors. LEDs 24, 28 are located at the respective focal points of their reflector shells 22, 26, as is well known in the art.

As used herein, the term "parabolic-type" is defined as a reflector that, while not necessarily having a reflecting surface that is a true parabola, is shaped to collect light emitted by a source located at a focus and reflect the light along an optical axis. As will be seen from the discussion below, a parabolic-type reflector does not necessarily have a smooth, parabolic reflecting surface, but rather may have facets that reflect light in the desired manner. A parabolic-type reflector may be highly non-symmetric, and may have a reflecting surface that is not a true or complete surface-of-revolution.

The following description is directed mainly to the components of and design methodology related to the outer lamp 18. It is to be understood that the disclosure may also apply to the inner lamp 16 and/or any lamp having a parabolic-type reflector.

As indicated in FIG. 2, LED 24 is assumed to be a point source that emits light in a fan-shaped pattern around the optical axis OA having an angular beam width β. The portions of the inner surface of reflector shell 22 that are located within the beam width β comprise the reflecting surface 34 of the reflector. As discussed in further detail below, the reflecting surface 34 is shaped in accordance with the method disclosed herein to produce a desired appearance in which the brightness, as apparent to an observer located to the rear of the vehicle an approximately on the optical axis OA, is substantially uniform around the entire perimeter of the area of the lamp.

Figure 3:
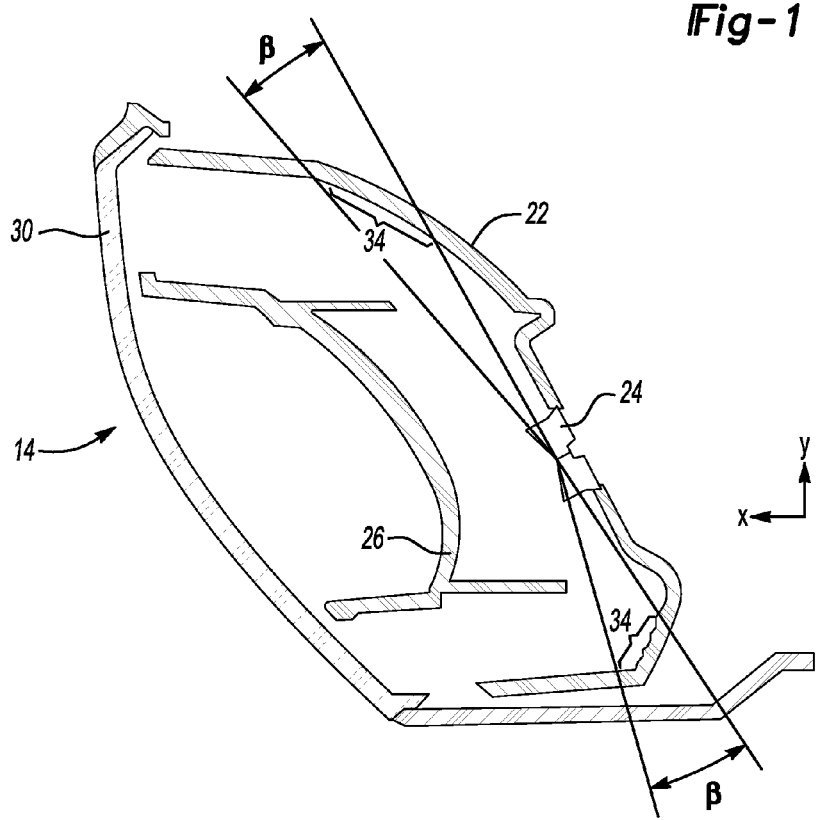
FIG. 3 is a schematic cross-sectional view taken along the line 3-3 indicated in FIG. 2.

FIG. 3 is a horizontal cross section through the lamp, and illustrates the highly non-symmetric shape of parabolic-type reflecting surface 34.

Figure 4:
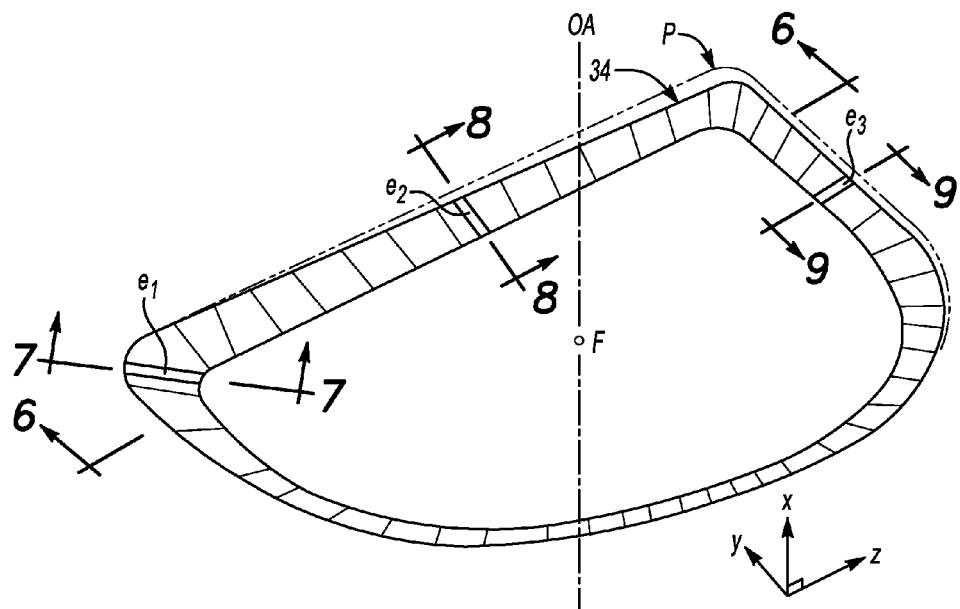
FIG. 4 is a schematic perspective view of a reflector surface being generated for use with the outer lamp of the lamp assembly of FIGS. 1-3.

FIG. 4 is a representation of a reflective surface 34 which may be designed or generated by the method disclosed below. It is shown separate from the rest of the reflector shell 22 and as having a thickness only for purposes of illustration. This is because the design method is directed toward generating a surface contour that, when used with a light source at the focus, reflects light to produce a desired visible appearance. The generated surface contour does not have any thickness, but rather is a locus of points defining the reflective surface which may be exported to, overlaid on, and/or otherwise combined with a solid CAD model of the reflector shell 22. The reflector shell may then be fabricated with the reflective surface 34 having the optimized contours generated by the design method.

FIG. 4 shows, in a highly schematic form, the reflective surface 34 separated from the reflector shell which supports it. Reflective surface 34 surrounds focus F, the point at which the light source (not shown) is located, and optical axis OA passing through focus F. The optical axis OA may be parallel with the vehicle x-axis (fore/aft or longitudinal axis), but this is not necessarily the case. All surfaces oriented toward the top of the page (along the optical axis and/or x-axis) in FIG. 4 are parabolic-type in cross-section to reflect light emanating from focus F parallel to the optical axis (toward the top of the page, as illustrated in FIG. 4).

The depth (measured parallel with the optical axis and/or x-axis) of the cross-section of reflective surface 34 is not constant around the perimeter of the D-shaped annulus but rather varies around that perimeter. This depth variation is indicated in FIG. 4 by the deviation between the upper edge of reflective surface 34 and a reference line P indicating the height of the top edge of the reflective surface at the location of the maximum depth cross-section, this maximum depth occurring in the vicinity of cross-section 7-7.

Figure 6:
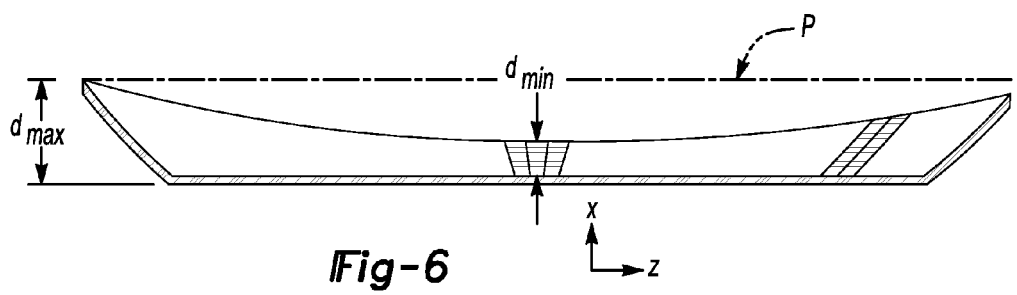
FIG. 6 is a cross section taken along line 6-6 of FIG. 4.

The variation in depth is further depicted in FIG. 6, where the depth of reflective surface 34 is shown to have a maximum depth $d_{max}$ at the location indicated. The depth of the reflective surface varies (having values less than or equal to $d_{max}$) along the portion of the perimeter visible in FIG. 6 and around the rest of the perimeter not visible in FIG. 6. The variation in depth of reflective surface 34 at each cross-section is determined by the design process described below. As noted above, the thickness of reflective surface 34 shown in FIGS. 6-9 is only for purposes of illustration.

Figure 5:
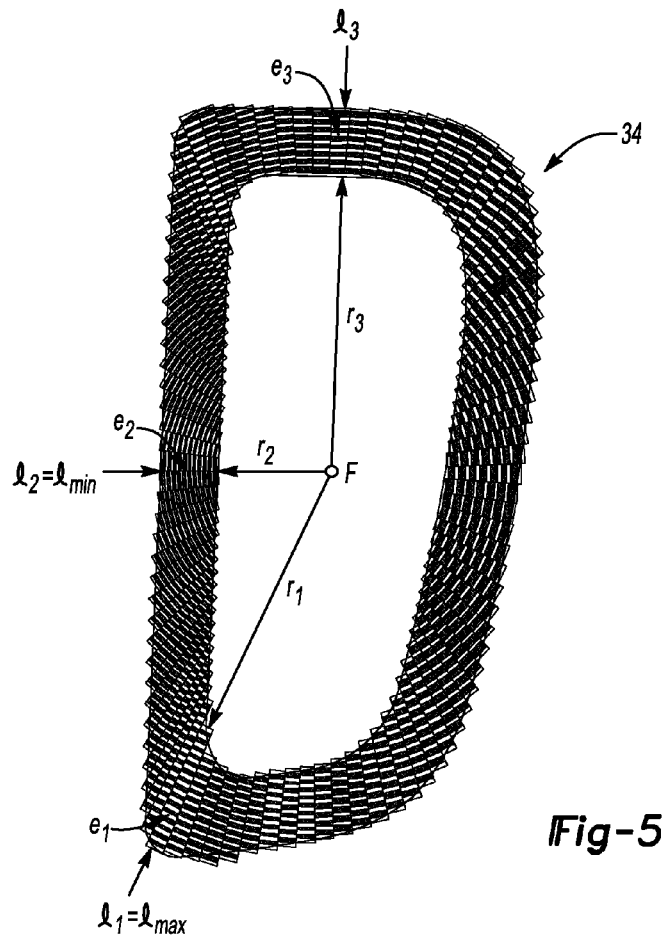
FIG. 5 is schematic view along the optical axis of the reflector surface of FIG. 4.

FIG. 5 shows reflective surface 34 as viewed parallel with the optical axis. In the design process, a first constraint is the shape or outline of lamp 18 as viewed parallel with the optical axis. In the example considered here, the desired shape is a generally annular, D-shaped outline surrounding the inner lamp 16.

A second design constraint is the available package space within the housing of the tail lamp assembly 14. Due to numerous vehicle design considerations, the package space allotted for reflector shell 22 will necessarily be limited. In the present discussion, the critical limitation is the maximum available depth d of reflector shell 22, as measured parallel to the x-axis and/or parallel to the optical axis.

A third design constraint is the available light produced by LED 24. Both the maximum light output (commonly expressed in lumens) and the shape or pattern (including the angle β) of light emitted by the LED must be considered.

The objective of the present design method is as follows: To generate a reflecting surface 34 having the proper contours to reflect light (emanating from a single source at the focus of the reflecting surface) such that, to an observer located along (or approximately along) the optical axis, the lamp has a uniform Apparent Brightness over the entirety of the lamp surface area. This is achieved by dividing the reflecting surface into discrete elements, analyzing/estimating the visible brightness of each element, then correcting the geometry of each element as necessary so that all elements are of approximately equal Apparent Brightness.

The design method begins by creating a computational model of the reflecting surface 34 and dividing the modeled reflecting surface into a plurality n of elements e. In the present example, the elements are defined as radial strips arranged circumferentially around focus F and are approximately 5° wide (see FIG. 5). Each element e is located a radial distance r from focus F and has a radial length l. As seen in the example of FIG. 5, the values of r and l for each element vary continuously around the circumference of reflective area 34. The radial distance r of any element e from the focus F may be vanishingly small.

At this initial stage of the design method, each element $e_i$ is assumed to have an initial depth $d\text{-init}_i$ that occupies the maximum available depth within the reflector shell 22 at the location of that element. In the present example, initial depth $d\text{-init}_i$ is constant (and equal to $d_{max}$) at all locations around the perimeter. It should be understood that the available depth is not necessarily constant around the perimeter of the reflector shell, so that the reflector shell may not have a uniform depth in the initial condition. In this initial condition, where $d\text{-init}_i = d_{max}$ for every element $e_i$, the Apparent Brightness of the lamp will vary around the circumference of the lamp.

For each element $e_i$, a value of Apparent Brightness (AB) may be determined. The term AB is used herein to quantify the amount of light per unit area that is reflected from the surface of the element, and that therefore will be visible to an observer positioned along the optical axis of the lamp. Any variation in AB over the visible surface of the lamp will be perceived by the observer as varying brightness. In general, AB is the ratio between the "amount" of light collected by (incident upon) a reflector element e, and the area of the element e visible to an observer located along the optical axis. The area of the element visible to an observer is, in general, equal to the area of the element projected onto a plane normal to the optical axis. This assumes a constant light density coming from the light source.

The units used to express AB may vary from case to case, depending upon considerations such as the geometry of the lamp being analyzed, simplifying assumptions appropriate for the geometry, and the shape and pattern of the elements under analysis.

In a most general case, to achieve uniform or approximately equal AB over the desired area or portion of the reflector, AB is calculated for each element, and the element $e_{min}$ having a minimum value of Apparent Brightness $AB_{min}$ is identified. Then all elements $e_i$ besides $e_{min}$ must have their dimensions and/or orientation changed or corrected in a manner to achieve a corrected Apparent Brightness $AB\text{-corr}_i$ that is equal to the limiting values $AB_{min}$.

The "amount" of light collected by an element may be assumed to be proportional to the area of the element projected onto a surface normal to the direction-of-arrival of the incoming, light rays that are incident upon the element. This projected area is referred to herein as $A_{incident}$.

For purposes of comparing the AB of elements with one another, the total amount of light reflected from each element may be assumed to be equal to the amount of light collected by an element. Since the total amount of light reflected from an element is divided by the visible area (the area visible to an observer located approximately along the optical axis) of the element to find AB, we have:

$$AB \equiv A_{incident}/A_{apparent}; \text{ where;} \qquad (1)$$

$A_{incident}$ is the area of the element projected on a surface normal to the vector of arriving incident light rays; and $A_{apparent}$ is the area of the element visible to an observer located on the optical axis.

Figure 7:
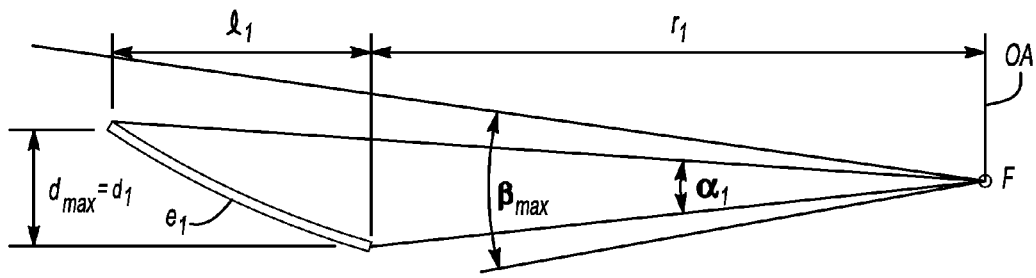
FIG. 7 is a cross section taken along line 7-7 in FIG. 4.

In the example under analysis here, because the elements are radially-extending strips and the light source is assumed to be a point source, AB is determined in the manner as depicted in FIG. 7. For light emanating from a point-source at F, the amount of incident upon each element is directly proportional to the light angle a subtended by the element within the light pattern.

Variations in width (perpendicular to radial length l) of the elements are relatively small and therefore, for simplicity of calculation, may be disregarded. The apparent area $A_{apparent}$ of each element may then be assumed to be proportional to its length l. The Apparent Brightness of each element is therefore expressed as:

$$AB_i = \alpha_i/l_i \qquad (2)$$

The value of the AB for each of the elements is calculated, and the minimum value of the Apparent Brightness $AB_{min}$ is identified. In the present example, the element having the value $AB_{min}$ is element $e_1$, which may be seen from FIG. 5 as being the element with the greatest length l (located at approximately the 7 o'clock position). FIG. 7 is the cross sectional view of element $e_1$.

Since the objective of the present design method is to achieve a uniform or consistent AB for all elements, the minimum Apparent Brightness $AB_{min}$ becomes the upper limit for all elements. The geometry of all other elements must be adjusted as necessary to achieve a value equal to $AB_{min}$. Since the length l of each element may not be changed without changing the overall appearance of the lamp (a design constraint), and the power or brightness of the light source (such as LED 24) is fixed (a design constraint), $AB_i$ may be reduced by decreasing the light angle $\alpha_i$ (the numerator in Equation 2) of each element.

Figure 8:
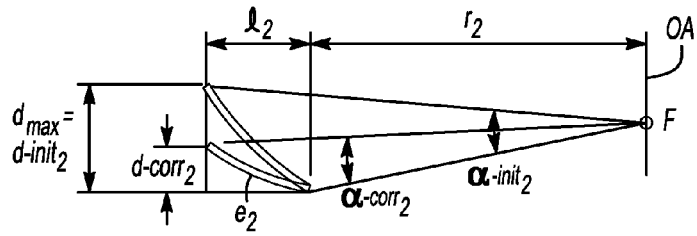
FIG. 8 is a cross section taken along line 8-8 in FIG. 4.

FIG. 8 illustrates an example of how each element is modified to achieve $AB_{min}$ by considering element $e_2$, the element having the smallest length l (located at approximately the 9 o'clock position in FIG. 5). The dashed line in FIG. 8 indicates the surface contour of element $e_2$ in the initial condition, where initial depth $d\text{-init}_2$ is equal to the maximum available depth $d_{max}$ at that location. If element $e_2$ were to maintain this initial depth, the resulting large value of the light angle $\alpha\text{-init}_2$ subtended by the element, combined with a small value of $l_2$, would result in an Apparent Brightness larger than $AB_{min}$.

To achieve an $AB_2$ equal to $AB_{min}$, we must reduce the angle $\alpha\text{-init}_2$ to an appropriate level. This is achieved by decreasing the initial depth $d\text{-init}_2$ to a corrected depth $d\text{-corr}_2$. The resulting, corrected contour of element $e_2$ is shown in solid line in FIG. 8, along with the corrected angle $\alpha\text{-corr}_2$. In this corrected contour, $\alpha\text{-corr}_2 = \alpha_1 \cdot l_2/l_1$. It thus follows that the corrected depth $d\text{-corr}_2$ must be set to the value necessary to achieve value of $\alpha\text{-corr}_2$ required to produce $AB_{min}$ (as established by element $e_1$).

Figure 9:
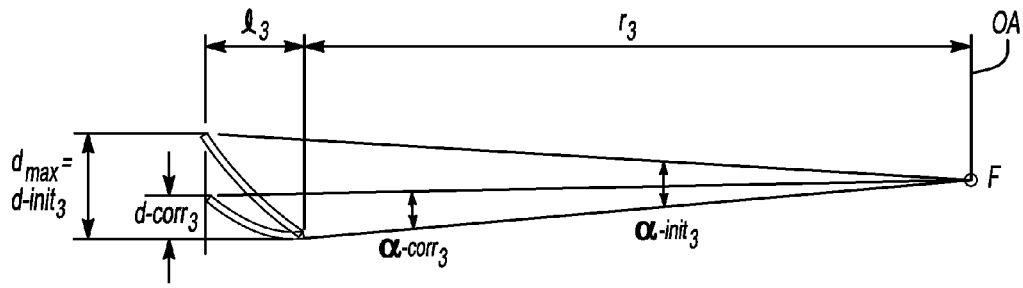
FIG. 9 is a cross section taken along line 9-9 in FIG. 4.

Another example of the adjustment of the depth of an element of reflective surface is shown in FIG. 9 in which element $e_3$ (located at approximately the 12 o'clock position in FIG. 5) is depicted. Element $e_3$ is at a distance $r_3$ from the focus at approximately equal to the distance $r_1$ of element $e_1$. Element $e_3$ has a length $l_3$ equal to the length $l_2$ of element $e_2$. Identical to the discussion in FIG. 7, and identical to the design method applied to each of the elements other than the limiting element $e_1$ the depth of the reflective element is reduced to a corrected depth necessary to give an angle $\alpha$ which permits the Apparent Brightness of that equal to element $e_1$.

Figure 10:
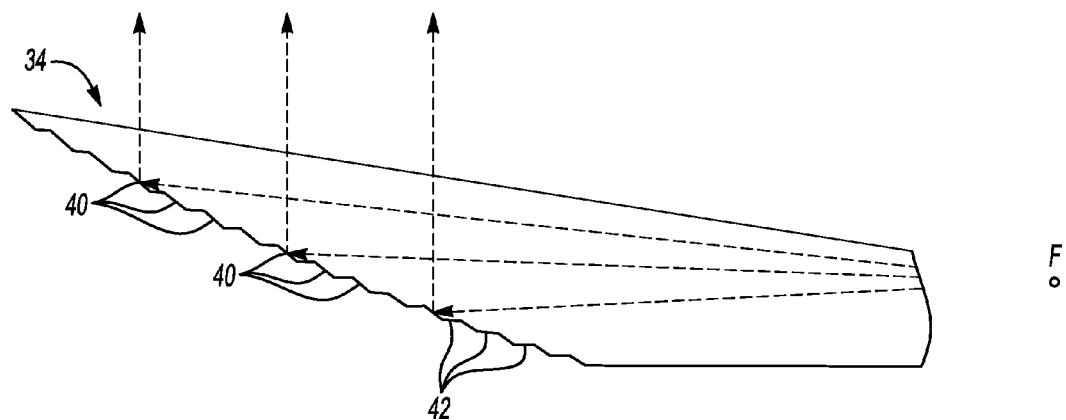
FIG. 10 is a schematic close-up cross section representative of a typical element from the reflector of FIGS. 4-9.

The cross-sections of the elements e (as seen in FIGS. 7-9) are not necessarily true parabolic curves (as defined in geometry), but rather may be reduced in depth (measured along the optical axis) in order to fit the required package space. This, as is well known in the art, may be achieved by forming a series of reflective facets which alternate with and are connected by lands. FIG. 10 is a schematic cross-sectional view representative of a typical element e of reflector surface 34 and is shown to include a plurality of reflective facets 40 oriented to receive light emitted from the focus F and reflect it in a direction parallel to the optical axis of the lamp. Adjacent facets 40 are separated by intervening lands 42, each land oriented such that its surface is approximately parallel with light rays emanating from the focus F. The size and spacing between the facets 40 is determined by, inter alia, the available depth d of the reflector shell and by manufacturing constraints.

Figure 11:
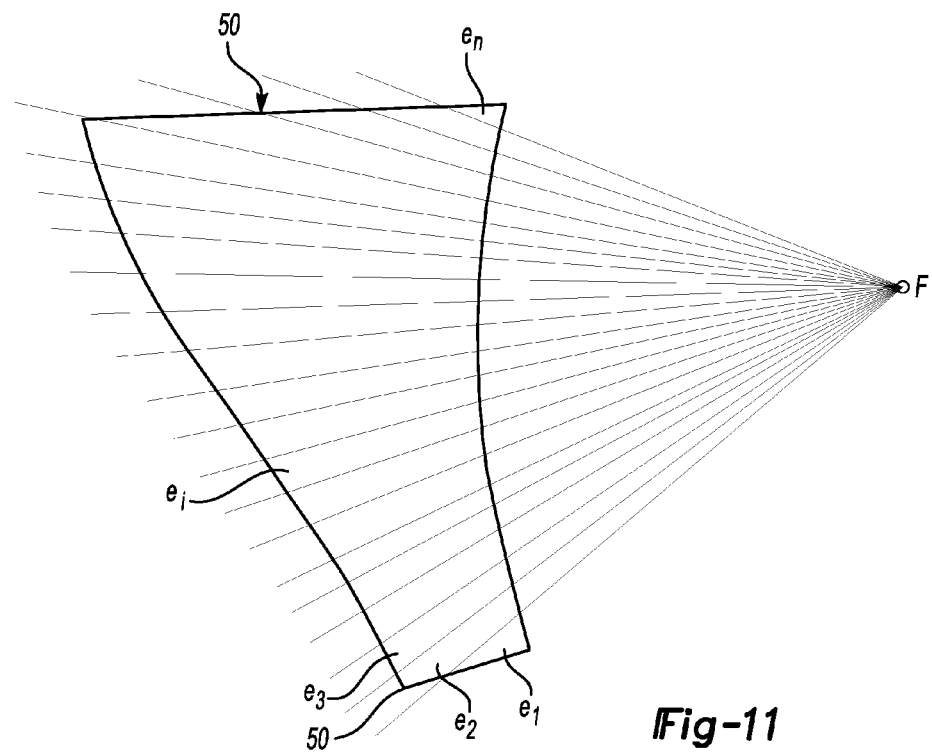
FIG. 11 is a schematic view of a second embodiment of a reflector.

The disclosed design optimization method may be applicable to any size or shape of parabolic-type reflector, and is not restricted to a reflector that completely surrounds a light source. FIG. 11 is an example of a reflector surface 50 extending around an arc of less than approximately 60° centered on a focus F. Surface 50 is divided into a plurality n of radial elements, $e_1$ through $e_n$. Assuming that the maximum depth of a reflector is one that it is by packaging constraints, the same method may be applied to making Apparent Brightness of each element in a form across the arc.

The disclosed method is not limited to an annular reflector. That is, the radial distance r of any element e from the focus F may be vanishingly small. For purposes of this disclosure, the shape of outer lamp 18 is described and defined as having an "annular-type" shape, meaning that the outline of the illuminated portion of the lamp (when viewed along the lamp's optical axis) extends around all or a portion of a sector or arc surrounding a center point, but is not necessarily circular. In an annular-type lamp, the profile of the lamp may vary in both radial distance from a focal point F of the lamp and a reflector length l around the arc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An analysis method for adjusting an Apparent Brightness of a Parabolic-Type reflector used with a light source located at a focus, the method comprising:
   a) creating a computational model of the reflector;
   b) dividing the model into a plurality n of elements e arrayed around the focus;
   c) for each element $e_i$, finding an Apparent Brightness $AB_i$ quantifying an amount of light emitted by the light source that is reflected along an optical axis of the reflector;
   d) identifying an element $e_{min}$ having a minimum value of Apparent Brightness $AB_{min}$; and
   e) for each element other than $e_{min}$, changing at least one of the dimensions or orientation of the element as necessary to achieve a corrected Apparent Brightness $AB\text{-corr}_i = AB_{min}$.

2. The method of claim 1 wherein steps c), d), and e) comprise:
   c) for each element $e_i$:
      i) finding incident light area $A_{incident\_i}$=an area of the element projected onto a surface normal to a direction-of-arrival of the light incident on the element;
      ii) finding $A_{apparent\_i}$=an area of the element projected onto a plane normal to the optical axis; and
      iii) finding an Apparent Brightness: $AB_i \equiv A_{incident\_i}/A_{apparent\_i}$;
   d) identifying an element $e_{min}$ having a minimum value of Apparent Brightness $AB_{min}$; and
   e) for each element other than $e_{min}$, finding a corrected incident area $A_{incident\text{-}corr\_i} = AB_{min} \times A_{apparent\_i}$.

3. The method of claim 2 wherein the light source is assumed to be a point source and an amount of light incident upon each element $e_i$ is directly proportional to a light-angle $\alpha_i$ (measured in a plane passing through the optical axis) of light emitted by the light source subtended by the element $e_i$.

4. The method of claim 1 further comprising:
   for each elements $e_i$, generating a series of radially-separated facets arrayed along a length h measured radially from the focus.

5. The method of claim 4 wherein immediately adjacent facets are separated by lands oriented parallel with rays of light emanating from the source.

6. An analysis method for adjusting an Apparent Brightness of a Parabolic-Type reflector used with a light source located at a focus, the method comprising:
   a) dividing a mathematical model of the reflector into a plurality n of elements e arrayed radially around the focus, each element $e_i$ having a length $l_i$ measured radially from the focus and perpendicular to an optical axis of the reflector, and each having an initial depth $d\text{-}init_i$ measured parallel to the optical axis;
   b) for each element $e_i$:
      i) finding a light-angle $\alpha_i$ (measured in a plane passing through the optical axis) of light emitted by the light source subtended by the element $e_i$; and
      ii) finding an Apparent Brightness, $AB_i = \alpha_i/l_i$;
   c) identifying a lowest-brightness element $e_{min}$ having a lowest value of Apparent Brightness $AB_{min}$; and
   d) for each element other than $e_{min}$:
      i) finding a required light-angle, $\alpha\text{-}corr_i = AB_{min} \times l_i$; and
      ii) while maintaining $l_i$, reducing initial depth $d\text{-}init_i$ to reach a corrected depth $d\text{-}corr_i$ necessary to achieve $\alpha\text{-}corr_i$.

7. The method of claim 6 further comprising:
   for each of the elements, generating a series of radially-separated facets spaced from one another along the length l.

8. The method of claim 7 wherein immediately adjacent facets are separated by lands oriented parallel with rays of light emanating from the source.

9. A lamp comprising:
   a light source located at a focus of the lamp and emitting light around an arc centered on an optical axis passing through the focus; and
   a Parabolic-Type reflector having a plurality n of elements e arrayed radially with respect to the optical axis, each element $e_i$:
   located a radial distance $r_i$ from the focus;
   having a length $l_i$ measured radially from and perpendicular to the optical axis;
   having a depth $d_i$ measured parallel with the optical axis; and
   subtending a light-angle $\alpha_i$ (measured in a plane containing the optical axis) within the light emitted from the source;
   wherein:
   the length $l_i$ and radial distance $r_i$ of adjacent elements varies around the arc; and
   the depth $d_i$ of each element varies in a manner to achieve a light-angle $\alpha_i$ such that $\alpha_i/l_i$ is a constant for all elements for which a uniform apparent brightness is desired.

10. The lamp of claim 9 wherein at least one of the elements $e_i$ comprises a plurality of facets arrayed along length $l_i$, each facet oriented to reflect the light along the optical axis, and adjacent facets separated by lands oriented parallel with rays of light rays from the source.

* * * * *